United States Patent
Saito et al.

(10) Patent No.: US 7,537,330 B2
(45) Date of Patent: May 26, 2009

(54) INK-JET RECORDING APPARATUS, INK-JET RECORDING METHOD, AND PRINT

(75) Inventors: Chie Saito, Nagano-ken (JP); Masayuki Momose, Tochigi-ken (JP)

(73) Assignee: Seiko Epson Corporation, Tokyo (JP)

( * ) Notice: Subject to any disclaimer, the term of this patent is extended or adjusted under 35 U.S.C. 154(b) by 459 days.

(21) Appl. No.: 11/374,412

(22) Filed: Mar. 13, 2006

(65) Prior Publication Data
US 2007/0085864 A1  Apr. 19, 2007

(30) Foreign Application Priority Data
Mar. 17, 2005 (JP) .............................. 2005-076933
Mar. 13, 2006 (JP) .............................. 2006-067020

(51) Int. Cl.
*G01D 11/00* (2006.01)
(52) U.S. Cl. ............................. 347/100; 347/95; 347/96
(58) Field of Classification Search ................. 347/100, 347/95, 96, 101; 106/31.6, 31.13, 31.27; 523/160
See application file for complete search history.

(56) References Cited

FOREIGN PATENT DOCUMENTS

| JP | 8-336979 | 12/1996 |
|---|---|---|
| JP | 2004-359946 | 12/2004 |

OTHER PUBLICATIONS

Computer-Generated English Translation of Specification and Claims and Patent Abstracts of Japan of JP 2004-359946 dated Dec. 24, 2004.
Computer-Generated English Translation of Specification and Claims and Patent Abstracts of Japan of JP 8-336979 dated Dec. 24, 1996.

*Primary Examiner*—Manish S Shah
(74) *Attorney, Agent, or Firm*—Ladas & Parry LLP

(57) ABSTRACT

Provided is an ink-jet recording apparatus equipped with an ink set included from n types (n is an integral number where $n \geq 2$), wherein the ratio of viscosity of ink of the minimum viscosity/viscosity of ink of the maximum viscosity in the ink set is 0.6 or less; wherein viscosity at 20° C. of the respective inks of the ink set is set to $V1, V2, \ldots, Vi, \ldots, Vn$ (where $V1$ is the maximum viscosity); wherein the nozzle resolution of a discharge nozzle allocated to the respective inks is set to $R1, R2, \ldots, Ri, \ldots, Rn$; and wherein when coefficient $ki = Vi/V1$, (i is an arbitrary integral number of 1 to n), $0.8 \times ki \times R1 \leq Ri \leq 1.2 \times ki \times R1$, and $0.2 \leq ki \leq 1.0$ is realized for every i.

8 Claims, 2 Drawing Sheets

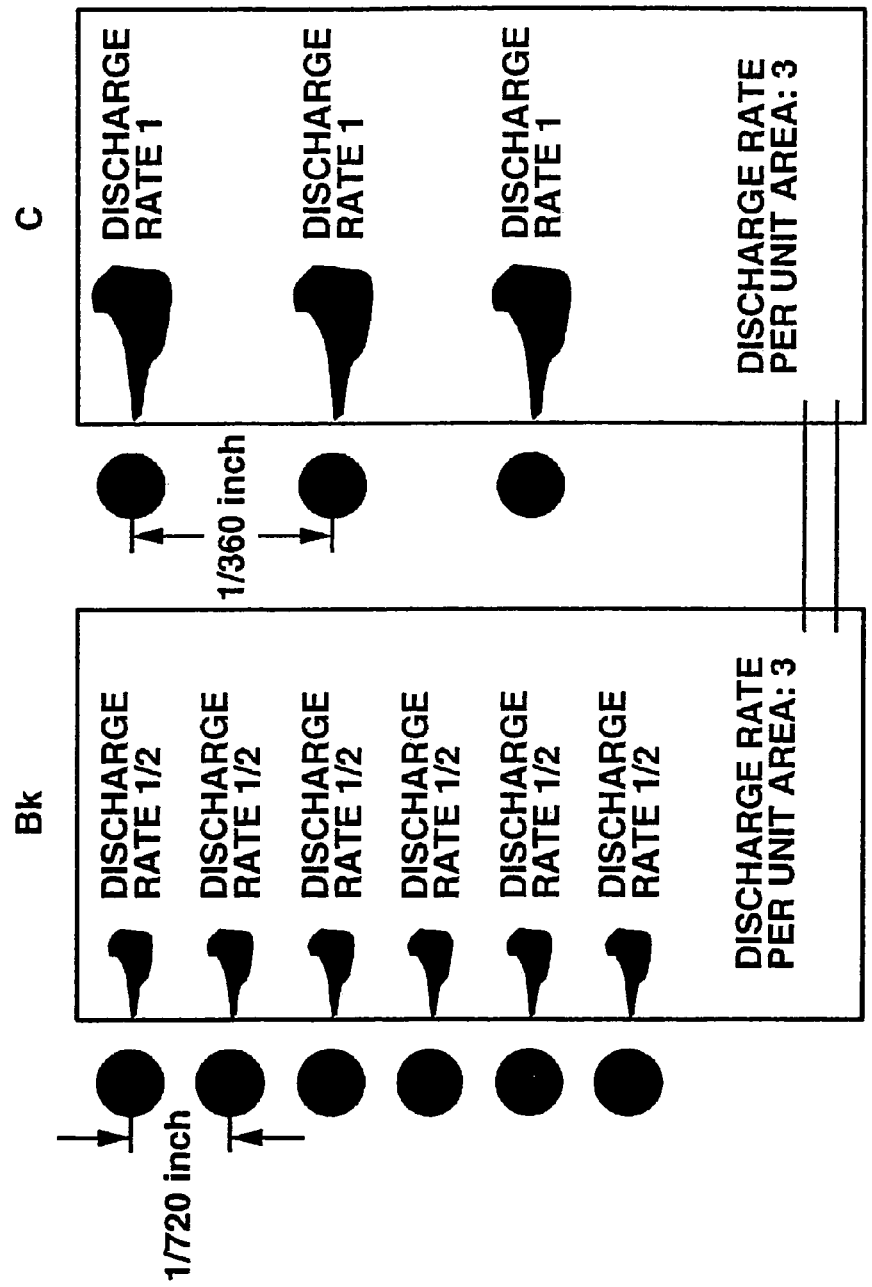

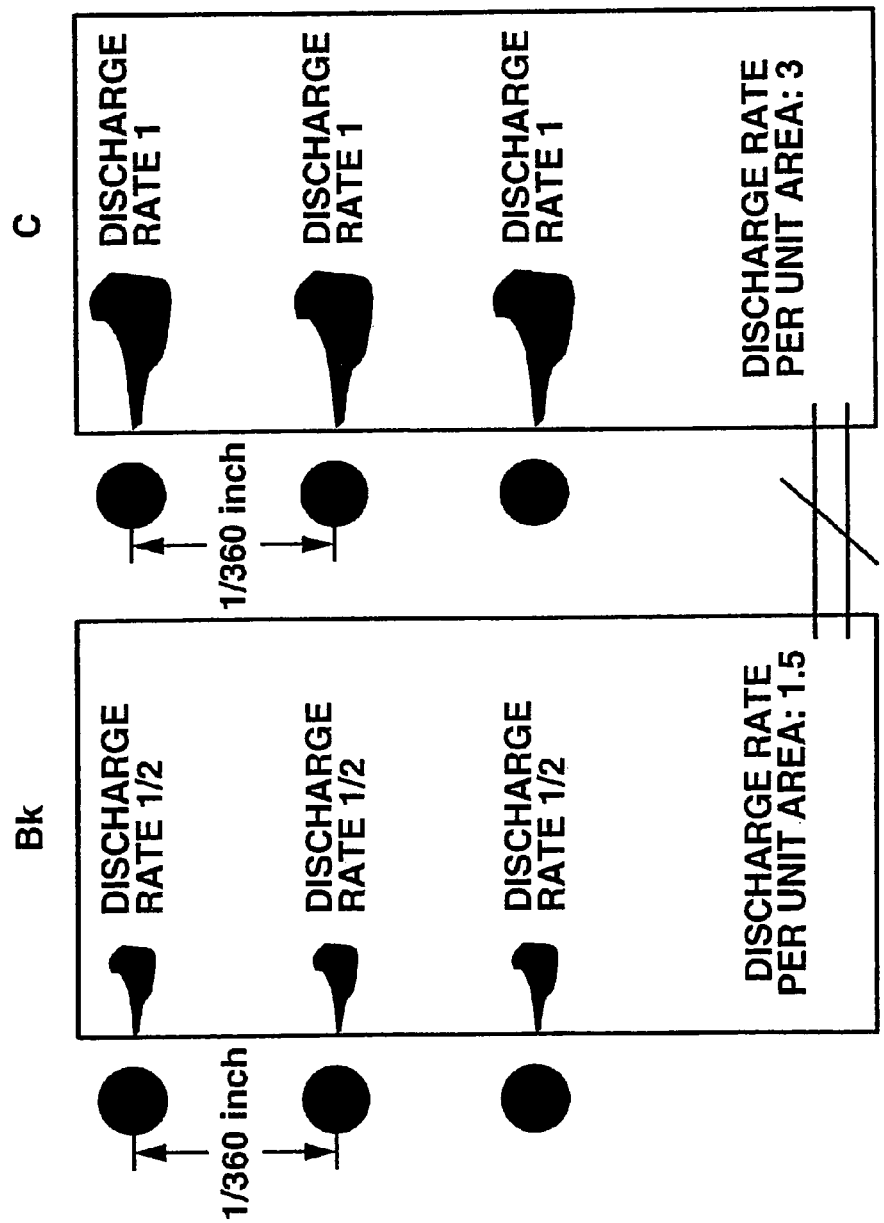

INK-JET RECORDING APPARATUS, INK-JET RECORDING METHOD, AND PRINT

CROSS-REFERENCES TO RELATED APPLICATIONS

The entire disclosure of Japanese Patent Application No. 2005-76933, filed on Mar. 17, 2005, and Japanese Patent Application No. 2006-67020, filed on Mar. 13, 2006, is expressly incorporated by reference herein.

BACKGROUND

1. Technical Field

The present invention pertains to an ink-jet recording apparatus equipped with an ink set comprised from inks having different viscosity and capable of maintaining a high printing quality.

2. Related Art

Various types of ink-jet recording apparatuses having favorable printing quality have been developed from the past. For example, Japanese Patent Laid-Open Publication No. H8-336979 (JP-A-1996-336979) discloses a color ink-jet recording apparatus that performs color printing by discharging a plurality of color inks, wherein bleeding is inhibited by setting the number of nozzles of a recording head of ink having slow fixation properties or a recording head of ink requiring ink discharge based on a low frequency due to viscosity or the droplet discharge volume to be greater than the number of nozzles of a recording head that discharges all other inks.

Nevertheless, even if the number of nozzles is increased as with this kind of ink-jet recording apparatus, the ink discharge amount per unit area will not increase. Further, this Publication does not provide a numerical description for the relation between the physicality of ink and nozzle resolution pertaining to such ink-jet recording apparatus and, therefore, the effectiveness is limited. With a conventional recording apparatus, there is a problem in that the printing quality cannot be secured when using an ink set comprised from inks having different viscosity.

SUMMARY

Thus, an advantage of some aspects of the invention is to provide an ink-jet recording apparatus equipped with an ink set comprised from inks having different viscosity and capable of maintaining a high printing quality.

According to an aspect of the invention, the foregoing object is achieved by providing the invention of 1 below:

1. An ink-jet recording apparatus equipped with an ink set comprised from n types (n is an integral number where $n \geq 2$), wherein the ratio of viscosity of ink of the minimum viscosity/viscosity of ink of the maximum viscosity in the ink set is 0.6 or less;

wherein viscosity at 20° C. of the respective inks of the ink set is set to $V1, V2, \ldots, Vi, \ldots, Vn$ (where $V1$ is the maximum viscosity);

wherein the nozzle resolution of a discharge nozzle allocated to the respective inks is set to $R1, R2, \ldots, Ri, \ldots, Rn$; and wherein when coefficient $ki=Vi/V1$, (i is an arbitrary integral number of 1 to n), $$0.8 \times ki \times R1 \leq Ri \leq 1.2 \times ki \times R1, \text{ and}$$

$$0.2 \leq ki \leq 1.0.$$

is realized for every i.

It is preferable that the present invention also provide the invention of 2 to 7 below:

2. The ink-jet recording apparatus according to 1 above, wherein the standard deviation $3\sigma$ of viscosity $V2, \ldots, Vi, \ldots, Vn$ of all inks excluding the ink of maximum viscosity is 2.0 or less.

3. The ink-jet recording apparatus according to 1 or 2 above, wherein the coloring material concentration contained in the ink of maximum viscosity is the highest among all inks.

4. The ink-jet recording apparatus according to any one of 1 to 3 above, wherein the ink of maximum viscosity is black ink.

5. The ink-jet recording apparatus according to 4 above, wherein the black ink is pigment ink.

According to another aspect of the invention, the present invention provides the invention of 6 below:

6. An ink-jet recording method for recording with an ink set comprised from n types (n is an integral number where $n \geq 2$), wherein the ratio of viscosity of ink of the minimum viscosity/viscosity of ink of the maximum viscosity in the ink set is 0.6 or less;

wherein viscosity at 20° C. of the respective inks of the ink set is set to $V1, V2, \ldots, Vi, \ldots, Vn$ (where $V1$ is the maximum viscosity);

wherein the nozzle resolution of a discharge nozzle allocated to the respective inks is set to $R1, R2, \ldots, Ri, \ldots, Rn$; and wherein when coefficient $ki=Vi/V1$, (i is an arbitrary integral number of 1 to n), $$0.8 \times ki \times R1 \leq Ri \leq 1.2 \times ki \times R1, \text{ and}$$

$$0.2 \leq ki \leq 1.0.$$

According to another aspect of the invention, the present invention provides the invention of 7 below:

7. A print in which an image is formed on a recording medium based on the ink-jet recording apparatus according to 1 above or the ink-jet recording method according to 6 above.

BRIEF DESCRIPTION OF THE DRAWINGS

FIG. 1 is a model diagram showing the relationship of the discharge rate of the respective inks discharged from the ink-jet recording apparatus of the present invention; and FIG. 2 is a model diagram showing the relationship of the discharge rate of the respective inks discharged from the ink-jet recording apparatus of the comparative examples.

DESCRIPTION OF EXEMPLARY EMBODIMENTS

The preferred embodiments of the ink-jet recording apparatus pertaining to the present invention are now explained.

The ink-jet recording apparatus of the present, as described above, is equipped with an ink set comprised from n types (n is an integral number where $n \geq 2$), wherein the ratio of viscosity of ink of the minimum viscosity/viscosity of ink of the maximum viscosity in the ink set is 0.6 or less; wherein viscosity at 20° C. of the respective inks of the ink set is set to $V1, V2, \ldots, Vi, \ldots, Vn$ (where $V1$ is the maximum viscosity); wherein the nozzle resolution of a discharge nozzle allocated to the respective inks is set to $R1, R2, \ldots, Ri, \ldots, Rn$; and wherein when coefficient $ki=Vi/V1$, (i is an arbitrary integral number of 1 to n), $0.8 \times ki \times R1 \leq Ri \leq 1.2 \times ki \times R1$, and $0.2 \leq ki \leq 1.0$ is realized for every i. Here, R1 represents the nozzle resolution of the discharge nozzle allocated to the ink of maximum viscosity V1. Incidentally, nozzle resolution R1, R2, ..., Ri, ..., and Rn represent the nozzle resolution of the discharge nozzle corresponding to the respective inks of viscosity V1, V2, ..., Vi, ..., and Vn.

Since the ink-jet recording apparatus is configured as described above, high nozzle resolution is provided to ink having high viscosity, and, as a result, the ink discharge amount per unit area can be ensured for all inks even in an ink set comprised from inks having different viscosity, and high printing quality can be maintained thereby. In other words, recording apparatus improves the O.D. value, solid color and anti-offset performance in a well balanced manner.

Further, in the ink set of the ink-jet recording apparatus according to the present invention, the standard deviation $3\sigma$ of viscosity V2, ..., Vi, ..., Vn of all inks excluding the ink of maximum viscosity is 2.0 or less, preferably 1.5 or less. If this standard deviation $3\sigma$ is greater than 2.0, there are cases when the solid color and OD value cannot be sufficiently obtained even if the following calculation formula of the present invention is satisfied.

As the ink set to be used in the present invention, for example, a four-color set of BkYMC comprised from black ink (Bk), yellow ink (Y), magenta ink (M), and cyan ink (C) may be used. Nevertheless, without limitation to the above, and ink set including light colored inks such as light magenta ink (LM) and light cyan ink (LC), or special colored ink such as red ink (R), green ink (G), orange ink (O), or violet ink (V) may also be used.

Specific examples of the ink-jet recording apparatus are now explained.

The ink-jet recording apparatus equipped with an ink set including black ink having the highest coloring material concentration and adjusted to V1=8.0 mPa·s in the foregoing formula of the present invention, and color ink adjusted to V2=V3=V4=4.0 mPa·s, and a nozzle configuration of R1=360 dpi, R2=R3=R4=180 dpi. This is because the relationship of k2=k3=k4=0.5, $0.8 \times ki(=0.5) \times R1$ $(=360) \leq R2$, R3, $R4 \leq 1.2 \times ki(=0.5) \times R1(=360)$[144 dpi$\leq$R2, R3, R4$\leq$216 dpi].

In order to simply explain the concept of the present invention, an ink-jet recording apparatus equipped with an ink set comprised from black ink where $\eta$(viscosity at 20° C.)=8 mPa·s and cyan ink where $\eta$=4 mPa·s is taken as an example. Printing of the nozzle resolution allocated to the respective inks is observed in the following cases. Nevertheless, the coloring material concentration in the black ink is higher than the coloring material concentration in the cyan ink. Below, Bk refers to black ink and C refers to cyan ink.

Minimum viscosity/maximum viscosity=4/8=0.5
$K(Bk)$=1.0, $k(C)$=4/8=0.5

Therefore, the relational expression in this ink-jet recording apparatus becomes:

In substitute of $0.8 \times ki \times R1 \leq Ri \leq 1.2 \times ki \times R1$, $0.8 \times 0.5 \times R(Bk) \leq R(C) \leq 1.2 \times 0.5 \times R(Bk)$.

(Incidentally, $0.2 \leq k(C) \leq 1.0$ is satisfied since $0.2 \leq 0.5 \leq 1.0$.)

Here, the following two cases are observed.

Bk nozzle resolution=720 dpi, C nozzle resolution=360 pdi   1)

Bk nozzle resolution=360 dpi, C nozzle resolution=360 pdi   2)

Nevertheless, the discharge capacity of the respective nozzles is able to discharge ink having a viscosity of 4 mPa·s in the amount of weight 1 (relative value). Therefore, ink having a viscosity of 8 mPa·s is discharged in the amount of weight 1/2.

In the case of 1)

$0.8 \times 0.5 \times 720 \leq 360 \leq 1.2 \times 0.5 \times 720$.

(=288) (=432)

Thus, this case falls within the applicable scope of the present invention.

This case 1) is now explained in detail with reference to the model diagram shown in FIG. 1.

FIG. 1 is a model diagram showing the relationship of the discharge rate of the respective inks discharged by the ink-jet recording apparatus in case 1). As shown in FIG. 1, with case 1), the discharge weight per unit area of black ink and cyan ink are equal, and it is possible to perform similar solid printing. Further, since the black ink has a higher coloring material concentration, it is possible to obtain a high O.D. value in the same print path.

Incidentally, in this case, black ink has high viscosity since it has high coloring material concentration. To adjust the high coloring material concentration in a state where the viscosity is adjusted to 4 mPa·s as with cyan ink means that it is necessary to reduce the moisturizing agent or other additives, and there is a possibility that the fill-in reliability, discharge stability and other characteristics will be subject to an adverse effect.

In the case of 2)

$0.8 \times 0.5 \times 360 \leq 360 \leq 1.2 \times 0.5 \times 360$ is not realized.

(=144) (=216)

Thus, this case falls outside the applicable scope of the present invention.

This case 2) is now explained in detail with reference to the model diagram shown in FIG. 2.

FIG. 2 is a model diagram showing the relationship of the discharge rate of the respective inks discharged by the ink-jet recording apparatus in case 2). As shown in FIG. 2, with case 2), the discharge weight per unit area of black ink is ½ of the discharge weight per unit area of cyan ink, and this does not enable a favorable solid color. In order to make the black solid color equivalent to the cyan solid color, it is necessary to move the print head or paper ⅟360 inches and execute a printing path one more time, the printing speed will deteriorate as a result.

In the two cases described above, and the similar two cases using black in where $\eta$=4 mPa·s and cyan ink where $\eta$=4 mPa·s are summarized below. Incidentally, in order to simplify this comparison, the ink weight required for performing solid printing to the unit area will be 3 (relative value).

| 1) | Nozzle resolution | Bk: 720 dpi, C: 360 pdi |
|---|---|---|
|  | Viscosity $\eta$ | Bk: 8 mPa·s, C: 4 mPa·s |

In this case 1 (applicable scope of present invention), the solid color has favorable with the discharge rate per unit area: Bk=3, C=3.

| 2) | Nozzle resolution | Bk: 360 dpi, C: 360 pdi |
|---|---|---|
|  | Viscosity $\eta$ | Bk: 8 mPa·s, C: 4 mPa·s |

In this case 2 (outside applicable scope of present invention), the solid color of black ink was insufficient at the discharge rate per unit area: Bk=1.5, C=3.

| 3) | Nozzle resolution | Bk: 720 dpi, C: 360 pdi |
|---|---|---|
|  | Viscosity η | Bk: 4 mPa · s, C: 4 mPa · s |

In this case 3 (outside applicable scope of present invention), although the solid color was favorable with the discharge rate of per unit area: Bk=6, C=3, the discharge rate of black ink was excess, and the print quality deteriorated as a result of infiltration and offset.

| 4) | Nozzle resolution | Bk: 360 dpi, C: 360 pdi |
|---|---|---|
|  | Viscosity η | Bk: 4 mPa · s, C: 4 mPa · s |

In this case 4 (outside applicable scope of present invention), although the solid color was favorable with the discharge rate of per unit area: Bk=3, C=3, since there is the task of increasing the black ink coloring material concentration, the O.D. value of print based on the black ink is low.

The ink to be used in the ink-jet recording apparatus of the present invention is used as recording liquid for being discharged as droplets from the printer head of the ink-jet printer according to the so-called ink-jet recording method in order to record and form images such as text and charts on a recording medium such as paper.

In the present invention, there is no particular limitation on the ink to be used so as long as an ink set having at least 2 types of inks. The ink composition is the same as the ink composition used in the ink for ordinary ink-jet recording.

Although there are more than types of ink in the ink set, it is preferable that there are 2 to 8 types of ink.

Although the ratio of viscosity of ink of the minimum viscosity/viscosity of ink of the maximum viscosity in the ink set is 0.6 or less, this is preferably 0.3 to 0.5 from the perspective of satisfying the various characteristics such as the discharge stability required in the ink used in ink-jet recording ink, and comprehensively balancing the type and quantity of the additive contained in the respective inks for ensuring anti-fill-in properties.

It is preferable that the coloring material concentration contained in the ink of maximum viscosity is the highest among all inks.

The maximum viscosity ink in the ink set is preferably black ink since most of the printing in offices and homes is conducted in black and white, and the present invention is able to effectively reply to strong improvement demands in the quality of black ink. Here, the black ink is preferably pigment ink using a coloring material as the pigment. This is because pint of high water resistance and weather resistance can be obtained in addition to being able to obtain high printing quality in multipurpose paper such as standard paper and recycled paper.

Although there is no particular limitation in the viscosity η of the ink at 20° C., the viscosity V1 of the maximum viscosity ink is preferably 6 to 15 mPa·s, and the viscosity V2, V3 . . . , Vn of all other inks is preferably 1 to 5 mPa·s.

Although there is no particular limitation on the nozzle resolution of the discharge nozzle group to be allocated to the ink, the nozzle resolution R1 of the maximum viscosity ink is preferably 600 to 1500 dpi, and all other nozzle resolutions R2, R3 . . . , Rn are preferably 90 to 500 dpi.

The ink-jet recording apparatus of the present invention can also be suitably employed in high speed printers such as a line head printer or ink-jet page printer.

Further, the present invention provides the following recording method. Preferred embodiments of the recording method are the same as the preferred embodiments explained with reference to the foregoing recording apparatus.

An ink-jet recording method for recording with an ink set comprised from n types (n is an integral number where n≧2), wherein the ratio of viscosity of ink of the minimum viscosity/viscosity of ink of the maximum viscosity in the ink set is 0.6 or less;

wherein viscosity at 20° C. of the respective inks of the ink set is set to V1, V2, . . . , Vi, . . . , Vn (where V1 is the maximum viscosity);

wherein the nozzle resolution of a discharge nozzle allocated to the respective inks is set to R1, R2, . . . , Ri, . . . , Rn; and wherein when coefficient $ki=Vi/V1$, (i is an arbitrary integral number of 1 to n), $$0.8 \times ki \times R1 \leq Ri \leq 1.2 \times ki \times R1, \text{ and}$$

$$0.2 \leq ki \leq 1.0$$

According to the ink-jet recording method described above, since high nozzle resolution is provided to ink having high viscosity, the ink discharge amount per unit area can be ensured for all inks even in an ink set comprised from inks having different viscosity, and high printing quality can be maintained thereby. In other words, recording apparatus improves the O.D. value, solid color and anti-offset performance in a well balanced manner.

Further, the present invention is able to provide a print in which an image is formed on a recording medium based on the foregoing ink-jet recording apparatus or ink-jet recording method, and this print is of a high printing quality. In other words, this print has a well-balanced O.D. value, solid color and anti-offset performance.

The present invention is now explained in further detail based on examples, but the present invention shall not be limited by such examples in any way.

Various colored inks (ink 1 to 10) of the coloring material type, coloring material concentration and viscosity shown in Table 1 are illustrated as example.

TABLE 1

| Color | Ink1 | Ink2 | Ink3 | Ink4 | Ink5 | Ink6 | Ink7 | Ink8 | Ink9 | Ink10 |
|---|---|---|---|---|---|---|---|---|---|---|
| Color | Bk | Bk | Bk | Cyan | Cyan | Cyan | Magenta | Magenta | Yellow | Yellow |
| Type of Coloring Material | Dye | Pigment | Pigment | Dye | Pigment | Pigment | Dye | Pigment | Dye | Pigment |
| Concentration of coloring Material | 8.0% | 7.0% | 4.0% | 3.0% | 3.5% | 3.0% | 4.0% | 3.5% | 4.5% | 4.5% |
| Viscosity/mPas | 8.5 | 8.2 | 4.5 | 3.9 | 5.1 | 4.2 | 4.0 | 3.7 | 3.6 | 3.9 |

These inks were used to prepare ink-jet recording apparatuses comprising one ink set among the ink sets A to F shown in Table 2 and one head among the heads A to D formed from the head shown in Table 2 in the combination shown in Table 3 or Table 4.

TABLE 2

| | Ink Set A | k Value | 3σ | Ink Set B | k Value | 3σ |
|---|---|---|---|---|---|---|
| Ink Set within Applicable Scope of Present Invention | Ink 1 | 1.00 | | Ink 2 | 1.00 | |
| | Ink 4 | 0.46 | | Ink 4 | 0.48 | |
| | Ink 7 | 0.47 | 0.62 | Ink 7 | 0.49 | 0.62 |
| | Ink 9 | 0.42 | | Ink 9 | 0.44 | |

| | Ink Set C | k Value | 3σ | Ink Set D | k Value | 3σ |
|---|---|---|---|---|---|---|
| Ink Set within Applicable Scope of Present Invention | Ink 2 | 1.00 | | Ink 2 | 1.00 | |
| | Ink 5 | 0.51 | | Ink 5 | 0.62 | |
| | Ink 8 | 0.45 | 0.75 | Ink 8 | 0.45 | 2.27 |
| | Ink 10 | 0.48 | | Ink 10 | 0.48 | |

According to Claim 2:
$3\sigma \leq 2.0$

| | Ink Set E | k Value | 3σ | Ink Set F | k Value | 3σ |
|---|---|---|---|---|---|---|
| Ink Set Outside Applicable Scope of Present Invention | Ink 3 | 1.00 | | Ink 3 | 1.00 | |
| | Ink 4 | 0.87 | | Ink 6 | 0.93 | |
| | Ink 7 | 0.89 | 0.62 | Ink 8 | 0.82 | 0.75 |
| | Ink 9 | 0.80 | | Ink 10 | 0.87 | |

According to Claim 1:
$0.2 \leq k(\min.) \leq 0.6$
$0.2 \leq k(\text{All}) \leq 0.1$

| Head Configuration | Head A | Nozzle Resolution/dpi | Head B | Nozzle Resolution/dpi | Head C | Nozzle Resolution/dpi | Head D | Nozzle Resolution/dpi |
|---|---|---|---|---|---|---|---|---|
| | Bk Nozzle Group | 360 | Bk Nozzle Group | 600 | Bk Nozzle Group | 720 | Bk Nozzle Group | 180 |
| | C Nozzle Group | 180 | C Nozzle Group | 300 | C Nozzle Group | 360 | C Nozzle Group | 180 |
| | M Nozzle Group | 180 | M Nozzle Group | 300 | M Nozzle Group | 360 | M Nozzle Group | 180 |
| | Y Nozzle Group | 180 | Y Nozzle Group | 300 | Y Nozzle Group | 360 | Y Nozzle Group | 180 |

TABLE 3

Combination of Ink Set and Head Configuration

Ink Set A + Head A

| | Ri | 0.8×k×R1 | 1.2×k×R1 |
|---|---|---|---|
| Bk | 360 | 288 | 432 |
| Cyan | 180 | 132 | 198 |
| Magenta | 180 | 136 | 203 |
| Yellow | 180 | 122 | 183 |

Ink Set A + Head B

| | Ri | 0.8×k×R1 | 1.2×k×R1 |
|---|---|---|---|
| Bk | 600 | 480 | 720 |
| Cyan | 300 | 220 | 330 |
| Magenta | 300 | 226 | 339 |
| Yellow | 300 | 203 | 305 |

TABLE 3-continued

Combination of Ink Set and Head Configuration

Ink Set A + Head C

| | Ri | 0.8×k×R1 | 1.2×k×R1 |
|---|---|---|---|
| Bk | 720 | 576 | 864 |
| Cyan | 360 | 264 | 396 |
| Magenta | 360 | 271 | 407 |
| Yellow | 360 | 244 | 366 |

Ink Set A + Head D

| | Ri | 0.8×k×R1 | 1.2×k×R1 |
|---|---|---|---|
| Bk | 180 | 144 | 216 |
| Cyan | 180 | 66 | 99 |
| Magenta | 180 | 68 | 102 |
| Yellow | 180 | 61 | 91 |

TABLE 3-continued

Combination of Ink Set and Head Configuration

Ink Set B + Head A

|         | Ri  | 0.8xkxR1 | 1.2xkxR1 |
|---------|-----|----------|----------|
| Bk      | 360 | 288      | 432      |
| Cyan    | 180 | 137      | 205      |
| Magenta | 180 | 140      | 211      |
| Yellow  | 180 | 126      | 190      |

Ink Set B + Head B

|         | Ri  | 0.8xkxR1 | 1.2xkxR1 |
|---------|-----|----------|----------|
| Bk      | 600 | 480      | 720      |
| Cyan    | 300 | 228      | 342      |
| Magenta | 300 | 234      | 351      |
| Yellow  | 300 | 211      | 316      |

Ink Set B + Head C

|         | Ri  | 0.8xkxR1 | 1.2xkxR1 |
|---------|-----|----------|----------|
| Bk      | 720 | 576      | 864      |
| Cyan    | 360 | 274      | 411      |
| Magenta | 360 | 281      | 421      |
| Yellow  | 360 | 253      | 379      |

Ink Set B + Head D

|         | Ri  | 0.8xkxR1 | 1.2xkxR1 |
|---------|-----|----------|----------|
| Bk      | 180 | 144      | 216      |
| Cyan    | 180 | 68       | 103      |
| Magenta | 180 | 70       | 105      |
| Yellow  | 180 | 63       | 95       |

Ink Set C + Head A

|         | Ri  | 0.8xkxR1 | 1.2xkxR1 |
|---------|-----|----------|----------|
| Bk      | 360 | 288      | 432      |
| Cyan    | 180 | 148      | 221      |
| Magenta | 180 | 130      | 195      |
| Yellow  | 180 | 137      | 205      |

Ink Set C + Head B

|         | Ri  | 0.8xkxR1 | 1.2xkxR1 |
|---------|-----|----------|----------|
| Bk      | 600 | 480      | 720      |
| Cyan    | 300 | 246      | 369      |
| Magenta | 300 | 217      | 325      |
| Yellow  | 300 | 228      | 342      |

Ink Set C + Head C

|         | Ri  | 0.8xkxR1 | 1.2xkxR1 |
|---------|-----|----------|----------|
| Bk      | 720 | 576      | 864      |
| Cyan    | 360 | 295      | 443      |
| Magenta | 360 | 260      | 390      |
| Yellow  | 360 | 274      | 411      |

Ink Set C + Head D

|         | Ri  | 0.8xkxR1 | 1.2xkxR1 |
|---------|-----|----------|----------|
| Bk      | 180 | 144      | 216      |
| Cyan    | 180 | 74       | 111      |
| Magenta | 180 | 65       | 97       |
| Yellow  | 180 | 68       | 103      |

TABLE 4

Ink Set D + Head A

|         | Ri  | 0.8xkxR1 | 1.2xkxR1 |
|---------|-----|----------|----------|
| Bk      | 360 | 288      | 432      |
| Cyan    | 180 | 179      | 269      |
| Magenta | 180 | 130      | 195      |
| Yellow  | 160 | 137      | 205      |

Ink Set D + Head B

|         | Ri  | 0.8xkxR1 | 1.2xkxR1 |
|---------|-----|----------|----------|
| Bk      | 600 | 480      | 720      |
| Cyan    | 300 | 299      | 448      |
| Magenta | 300 | 217      | 325      |
| Yellow  | 300 | 228      | 342      |

Ink Set D + Head C

|         | Ri  | 0.8xkxR1 | 1.2xkxR1 |
|---------|-----|----------|----------|
| Bk      | 720 | 576      | 864      |
| Cyan    | 360 | 358      | 537      |
| Magenta | 360 | 250      | 390      |
| Yellow  | 360 | 274      | 411      |

Ink Set D + Head D

|         | Ri  | 0.8xkxR1 | 1.2xkxR1 |
|---------|-----|----------|----------|
| Bk      | 180 | 144      | 216      |
| Cyan    | 180 | 90       | 134      |
| Magenta | 180 | 65       | 97       |
| Yellow  | 180 | 68       | 103      |

Ink Set E + Head A

|         | Ri  | 0.8xkxR1 | 1.2xkxR1 |
|---------|-----|----------|----------|
| Bk      | 360 | 288      | 432      |
| Cyan    | 180 | 250      | 374      |
| Magenta | 180 | 256      | 384      |
| Yellow  | 180 | 230      | 346      |

Ink Set E + Head B

|         | Ri  | 0.8xkxR1 | 1.2xkxR1 |
|---------|-----|----------|----------|
| Bk      | 600 | 480      | 720      |
| Cyan    | 300 | 416      | 624      |
| Magenta | 300 | 427      | 640      |
| Yellow  | 300 | 384      | 576      |

Ink Set E + Head C

|         | Ri  | 0.8xkxR1 | 1.2xkxR1 |
|---------|-----|----------|----------|
| Bk      | 720 | 576      | 864      |
| Cyan    | 360 | 499      | 479      |
| Magenta | 360 | 512      | 768      |
| Yellow  | 360 | 461      | 691      |

Ink Set E + Head D

|         | Ri  | 0.8xkxR1 | 1.2xkxR1 |
|---------|-----|----------|----------|
| Bk      | 180 | 144      | 216      |
| Cyan    | 180 | 125      | 187      |
| Magenta | 180 | 128      | 192      |
| Yellow  | 180 | 115      | 173      |

Ink Set F + Head A

|         | Ri  | 0.8xkxR1 | 1.2xkxR1 |
|---------|-----|----------|----------|
| Bk      | 360 | 288      | 432      |
| Cyan    | 180 | 259      | 403      |

TABLE 4-continued

| | | | |
|---|---|---|---|
| Magenta | 180 | 237 | 355 |
| Yellow | 180 | 250 | 374 |

Ink Set F + Head B

| | Ri | 0.8xkxR1 | 1.2xkxR1 |
|---|---|---|---|
| Bk | 600 | 480 | 720 |
| Cyan | 300 | 448 | 672 |
| Magenta | 300 | 395 | 592 |
| Yellow | 300 | 416 | 624 |

Ink Set F + Head C

| | Ri | 0.8xkxR1 | 1.2xkxR1 |
|---|---|---|---|
| Bk | 720 | 576 | 864 |
| Cyan | 360 | 538 | 806 |
| Magenta | 360 | 474 | 710 |
| Yellow | 360 | 499 | 749 |

Ink Set F + Head D

| | Ri | 0.8xkxR1 | 1.2xkxR1 |
|---|---|---|---|
| Bk | 180 | 144 | 216 |
| Cyan | 180 | 134 | 202 |
| Magenta | 180 | 118 | 178 |
| Yellow | 180 | 125 | 187 |

These ink-jet recording apparatuses were used to form a print on a recording medium, and Evaluations 1 to 3 were conducted according to the following criteria. The results are shown in Table 5.

Evaluation 1: O.D. value of ink providing minimum discharge ink weight (average value of 5 sheets of paper)

Determination A 1.40 or more

Determination B 1.25 or more, less than 1.40

Determination C 1.10 or more, less than 1.25

Determination D less than 1.10

Evaluation 2: solid color

Determination A There were no white streaks in the solid printed portion of all 5 evaluated sheets;

Determination B White streaks could be visually observed in the solid printed portion of 2 types of paper or less;

Determination C White streaks could be visually observed in the solid printed portion of 4 types of paper or less;

Determination D White streaks could be visually observed in the solid printed portion of all 5 evaluated sheets.

Evaluation 3: Offset when viewing printed matter from the back side

Determination A There was hardly any offset in all 5 evaluated sheets;

Determination B Offset could be visually observed in 2 types of paper or less;

Determination C Offset could be visually observed in 4 types of paper or less;

Determination D Offset could be visually observed in all 5 evaluated sheets.

Evaluation was conducted using the following 5 types of standard paper and recycled paper. Xerox 4024, Xerox P, Hmmermill copyplus (alkaline paper), EPP (acid paper), Xerox R (recycled paper).

TABLE 5

| | | Head | | | |
|---|---|---|---|---|---|
| | | A | B | C | D |
| Ink Set | A | C | C | B | D |
| | | B | A | A | D |
| | | B | C | C | D |
| | B | B | B | A | D |
| | | B | A | A | D |
| | | A | B | B | D |
| | C | B | B | A | D |
| | | B | A | A | D |
| | | A | B | B | A |
| | D | B | B | A | D |
| | | C | B | B | D |
| | | A | B | B | D |
| | E | B | B | A | D |
| | | B | A | A | B |
| | | B | B | B | B |
| | F | B | B | C | B |
| | | B | A | A | B |
| | | B | B | B | A |

Upper Row: O.D. value of ink providing highest viscosity
Middle Row: Solid color
Lower Row: Offset when viewed from back side of print Configuration within applicable scope of present invention (examples)

Configuration outside applicable scope of present invention (comparative examples)

The present invention possesses industrial applicability as an ink-jet recording apparatus and ink-jet recording method in which high nozzle resolution is provided to ink having high viscosity, and, as a result, the ink discharge amount per unit area can be ensured for all inks even in an ink set comprised from inks having different viscosity, and high printing quality can be maintained thereby, and also as a print having high printing quality.

According to the present invention, provided is an ink-jet recording apparatus and ink-jet recording method in which high nozzle resolution is provided to ink having high viscosity, and, as a result, the ink discharge amount per unit area can be ensured for all inks even in an ink set comprised from inks having different viscosity, and high printing quality can be maintained thereby.

Further, according to the present invention, provided is an ink-jet recording method in which high nozzle resolution is provided to ink having high viscosity, and, as a result, the ink discharge amount per unit area can be ensured for all inks even in an ink set comprised from inks having different viscosity, and high printing quality can be maintained thereby, and also a print having high printing quality.

What is claimed is:

1. An ink-jet recording apparatus equipped with an ink set comprised from n types (n is an integral number where n≧2), wherein the ratio of viscosity of ink of the minimum viscosity/viscosity of ink of the maximum viscosity in the ink set is 0.6 or less;

wherein viscosity at 20° C. of the respective inks of the ink set is set to V1, V2, ..., Vi, ..., Vn (where V1 is the maximum viscosity);

wherein the nozzle resolution of a discharge nozzle allocated to the respective inks is set to R1, R2, ..., Ri, ..., Rn; and wherein when coefficient ki=Vi/V1, (i is an arbitrary integral number of 1 to n), $$0.8 \times ki \times R1 \leq Ri \leq 1.2 \times ki \times R1, \text{ and}$$

$$0.2 < ki \leq 1.0$$

is realized for every i.

2. The ink-jet recording apparatus according to claim 1, wherein the standard deviation 3σ of viscosity V2, ..., Vi, ..., Vn of all inks excluding the ink of maximum viscosity is 2.0 or less.

3. The ink-jet recording apparatus according to claim 1, wherein the coloring material concentration contained in the ink of maximum viscosity is the highest among all inks.

4. The ink-jet recording apparatus according to claim 1, wherein the ink of maximum viscosity is black ink.

5. The ink-jet recording apparatus according to claim 4, wherein the black ink is pigment ink.

6. An ink-jet recording method for recording with an ink set comprised from n types (n is an integral number where n≧2), wherein the ratio of viscosity of ink of the minimum viscosity/viscosity of ink of the maximum viscosity in the ink set is 0.6 or less;

wherein viscosity at 20° C. of the respective inks of the ink set is set to V1, V2, ..., Vi, ..., Vn (where V1 is the maximum viscosity);

wherein the nozzle resolution of a discharge nozzle allocated to the respective inks is set to R1, R2, ..., Ri, ..., Rn; and wherein when coefficient ki=Vi/V1, (i is an arbitrary integral number of 1 to n), $$0.8 \times ki \times R1 \leq Ri \leq 1.2 \times ki \times R1, \text{ and}$$

$$0.2 \leq ki < 1.0$$

is realized for every i.

7. A print in which an image is formed on a recording medium based on the ink-jet recording apparatus according to claim 1.

8. A print in which an image is formed on the ink-jet recording method according to claim 6.

* * * * *